United States Patent
Park et al.

(10) Patent No.: US 9,197,997 B2
(45) Date of Patent: *Nov. 24, 2015

(54) METHOD FOR POSITION UPDATE IN M2M COMMUNICATION, AND APPARATUS USING SAME

(75) Inventors: Gi Won Park, Anyang-si (KR); Young Soo Yuk, Anyang-si (KR); Jeong Ki Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 40 days.

This patent is subject to a terminal disclaimer.

(21) Appl. No.: 14/233,097

(22) PCT Filed: Jul. 26, 2012

(86) PCT No.: PCT/KR2012/005983
§ 371 (c)(1),
(2), (4) Date: Jan. 15, 2014

(87) PCT Pub. No.: WO2013/015639
PCT Pub. Date: Jan. 31, 2013

(65) Prior Publication Data
US 2014/0148199 A1    May 29, 2014

Related U.S. Application Data

(60) Provisional application No. 61/512,416, filed on Jul. 28, 2011.

(51) Int. Cl.
*H04W 4/02* (2009.01)
*H04W 60/00* (2009.01)
(Continued)

(52) U.S. Cl.
CPC .............. *H04W 4/023* (2013.01); *H04W 4/005* (2013.01); *H04W 60/00* (2013.01); *H04W 68/00* (2013.01)

(58) Field of Classification Search
None
See application file for complete search history.

(56) References Cited

U.S. PATENT DOCUMENTS

2008/0069031 A1* 3/2008 Zhang et al. ................... 370/328
2008/0220770 A1* 9/2008 Qi et al. ..................... 455/426.1
(Continued)

FOREIGN PATENT DOCUMENTS

KR 10-2009-0100478 A 9/2008
WO 2010/077002 A2 7/2010
WO 2011/068366 A2 6/2011

OTHER PUBLICATIONS

Honggang Li et al., "Optimized schemes for network re-entry for M2M in 16m," IEEE 802.16 Broadband Wireless Access Working Group, May 8, 2011.*

(Continued)

*Primary Examiner* — Noel Beharry
*Assistant Examiner* — Nicole E King
(74) *Attorney, Agent, or Firm* — Dentons US LLP

(57) ABSTRACT

Provided are a method for performing a position update in machine to machine (M2M) communication, and an apparatus using the method. In an idle mode, an M2M apparatus receives a paging message from a base station. The paging message comprises an action code, a network access type, and a resource offset. The action code is an indication for the M2M apparatus to perform a position update; the network access type is an indication for the allocation of resources for a ranging request; and the resource offset is an indication for an offset for uplink allocation. The M2M apparatus transmits the ranging request message to the base station by means of the uplink allocation.

12 Claims, 7 Drawing Sheets

(51) Int. Cl.
*H04W 4/00* (2009.01)
*H04W 68/00* (2009.01)

(56) References Cited

U.S. PATENT DOCUMENTS

| | | | |
|---|---|---|---|
| 2009/0213766 A1* | 8/2009 | Chindapol et al. | 370/278 |
| 2009/0227265 A1* | 9/2009 | Kang et al. | 455/456.1 |
| 2009/0291716 A1* | 11/2009 | Lee et al. | 455/574 |
| 2010/0041399 A1* | 2/2010 | Kim et al. | 455/434 |
| 2010/0067467 A1* | 3/2010 | Cho et al. | 370/329 |
| 2010/0246490 A1* | 9/2010 | Lavi et al. | 370/328 |
| 2011/0053657 A1* | 3/2011 | Jl | 455/574 |
| 2011/0075604 A1* | 3/2011 | Fong et al. | 370/328 |

OTHER PUBLICATIONS

Li, Honggang et al., "Idle mode optimizations for fixed M2M devices", IEEE 802.16 Broadband Wireless Access Working Group, Jul. 20, 2011.

Park, Giwon et al., "Ranging resource allocation for idle mode fixed M2M device in WirelessMAN IMT-Advanced system", IEEE 802.16 Broadband Wireless Access Working Group, Sep. 21, 2011.

* cited by examiner

METHOD FOR POSITION UPDATE IN M2M COMMUNICATION, AND APPARATUS USING SAME

This application is a 35 USC §371 National Stage entry of International Application No. PCT/KR2012/005983, filed on Jul. 26, 2012, and claims priority to U.S. Provisional Application No. 61/512,416 filed Jul. 28, 2011, each of which is hereby incorporated by reference in its entirety.

BACKGROUND OF THE INVENTION

1. Field of the Invention

The present invention relates to wireless communication, and more particularly, to a method of performing a location update for machine to machine (M2M) communication in a wireless communication system, and a device using the method.

2. Related Art

Machine to machine (M2M) communication (also called machine type communication (MTC)) is one type of data communication including one or more entities not requiring human interactions. That is, the M2M communication refers to the concept of communication based on the existing wireless communication network used by a machine device instead of a user equipment used by a user. The machine device used in the M2M communication can be called a M2M device. There are various M2M devices such as a vending machine, a machine of measuring a water level at a dam, etc.

The M2M device has a feature different from that of a typical user equipment. Therefore, a service optimized to the M2M communication may differ from a service optimized to human-to-human communication. In comparison with a current mobile network communication service, the M2M communication can be characterized as a different market scenario, data communication, less costs and efforts, a potentially great number of M2M devices, wide service areas, low traffic for each M2M device, etc.

A typical location update is used to recognize a location of a user equipment in a paging group. However, the M2M device may have a mobility significantly less than or greater than that of the user equipment.

There is a need for a location update method considering a feature of M2M communication.

SUMMARY OF THE INVENTION

The present invention provides a method of performing a location update for machine to machine (M2M) communication and a device using the method.

In an aspect, a method for performing a location update in machine-to-machine (M2M) communication is provided. The method includes entering, by a M2M device, into an idle modem, receiving, by the M2M device in the idle mode, a paging message from a base station, the paging message includes an action code, a network access type and a resource offset, the action code indicating that the M2M device performs a location update, the network access type indicating a resource allocation for a ranging request, the resource offset indicating an offset for an uplink assignment, and transmitting, by the M2M device, the ranging request to the base station by using the uplink assignment.

The paging message may further include a M2M group identifier that identifies a group to which the M2M device belongs.

The paging message may further include a fixed M2M deregistration identifier (FMDID) which is a 16-bit identifier that uniquely identifies the M2M device in domain of the base station.

In another aspect, a device configured for performing a location update in machine-to-machine (M2M) communication is provided. The device includes a radio frequency unit for receiving and transmitting a radio signal, and a processor operatively coupled with the radio frequency unit and configured to enter into an idle mode, receive a paging message from a base station, the paging message includes an action code, a network access type and a resource offset, the action code indicating that the M2M device performs a location update, the network access type indicating a resource allocation for a ranging request, the resource offset indicating an offset for an uplink assignment, and instruct the radio frequency unit to transmit the ranging request to the base station by using the uplink assignment.

A location update is proposed by considering a traffic feature and a mobility specific to machine to machine (M2M) communication. A signaling overhead caused by the location update can be decreased, and power of a M2M device can be saved.

DESCRIPTION OF EXEMPLARY EMBODIMENTS

Figure 1:
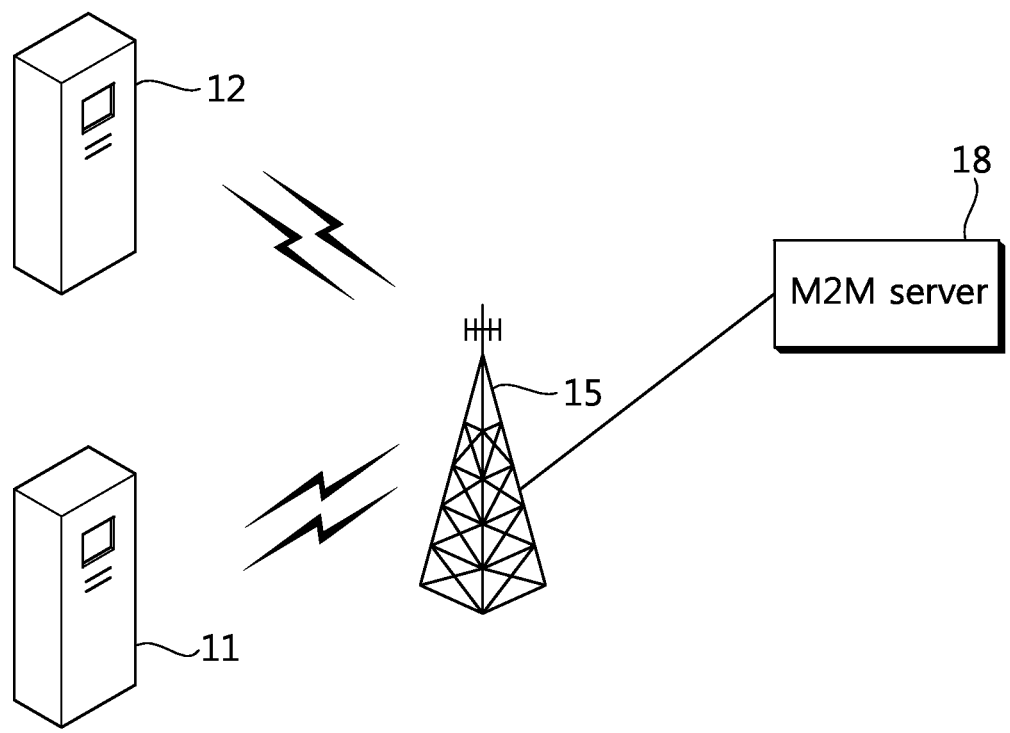
FIG. 1 shows an example of machine to machine (M2M) communication.

FIG. 1 shows an example of machine to machine (M2M) communication.

The M2M communication is also called a machine type communication (MTC), and refers to information exchange between M2M devices 11 and 12 via a base station (BS) 15 without human interactions and information exchange between the M2M device 11 and a M2M server 18 via the BS.

The M2M server 18 is an entity for communicating with the M2M device 11. The M2M server executes a M2M application, and provides a M2M-specific service to the M2M device 11.

The M2M device 11 is a wireless device for providing the M2M communication, and may be fixed or mobile. The M2M device is also called a MTC device.

A service provided using the M2M communication is differentiated from the existing communication service requiring human intervention, and its service range is various, such as tracking, metering, payment, medical field services, remote controlling, etc.

Representative examples of individual service requirements of M2M features are as follows.

1) Time controlled feature: This is a case in which the M2M device transmits or receives data only in a pre-defined specific duration. Therefore, unnecessary signaling performed outside the pre-defined specific duration can be avoided.

2) Time tolerant feature: This is a case in which the M2M device may delay data delivery. If a network load is greater than a pre-determined load threshold, a network operator may restrict network access of the M2M device or data transmission to another MTC device, and may dynamically restrict an amount of data that can be delivered by the MTC device in a specific region.

3) Offline indication feature: This is a case in which a notification is requested to the M2M device at a proper time when signaling is no longer possible between the M2M device and the network.

4) Priority alarm message (PAM) feature: This is a case in which, at the occurrence of a theft, a vandalism, or an emergency situation requiring an immediate attention, the M2M device preferentially reports this to the network.

It is considered that hundreds to thousands of M2M devices are deployed in one cell (or BS). Accordingly, it is difficult to identify the M2M devices by using only the existing user equipment identifiers, and thus the following identifier is taken into account.

Station identifier (STID): The STID is used to identify the M2M devices in the domain of the BS. The BS may assign the same STID to multiple M2M devices.

M2M Group Identifier (MGID): The MGID is a 12-bit value that uniquely identifies a downlink multicast service flow shared by a group of M2M devices within a M2M Group Zone. The M2M Group Zone is a logical zone comprising one or more BSs. The M2M Group Zone is identified by a M2M GROUP ZONE ID. The MGID may be assigned during dynamic service addition (DSA) procedure. The assigned MGID may be retained by the M2M device even in idle state unless the M2M device exits from the network or the network explicitly deletes the service flow associated with the MGID.

Fixed M2M Deregistration ID (FMDID): The FMDID is a 16-bit value that uniquely identifies a M2M device in domain of the BS. The FMDID is assigned to the M2M device by the BS during idle mode entry and released during the network reentry.

Now, the idle mode operation in an IEEE 802.16m-based system will be described with reference to institute of electrical and electronics engineers (IEEE) P802.16m/D10 "Part 16: Air Interface for Broadband Wireless Access Systems: Advanced Air Interface" released at Nov. 24, 2010. However, a wireless communication system to which the present invention is applied is not limited to the IEEE 802.16m-based system. Thus, the present invention is also applicable to various wireless communication systems such as 3rd generation partnership project (3GPP) long term evolution (LTE).

Figure 2:
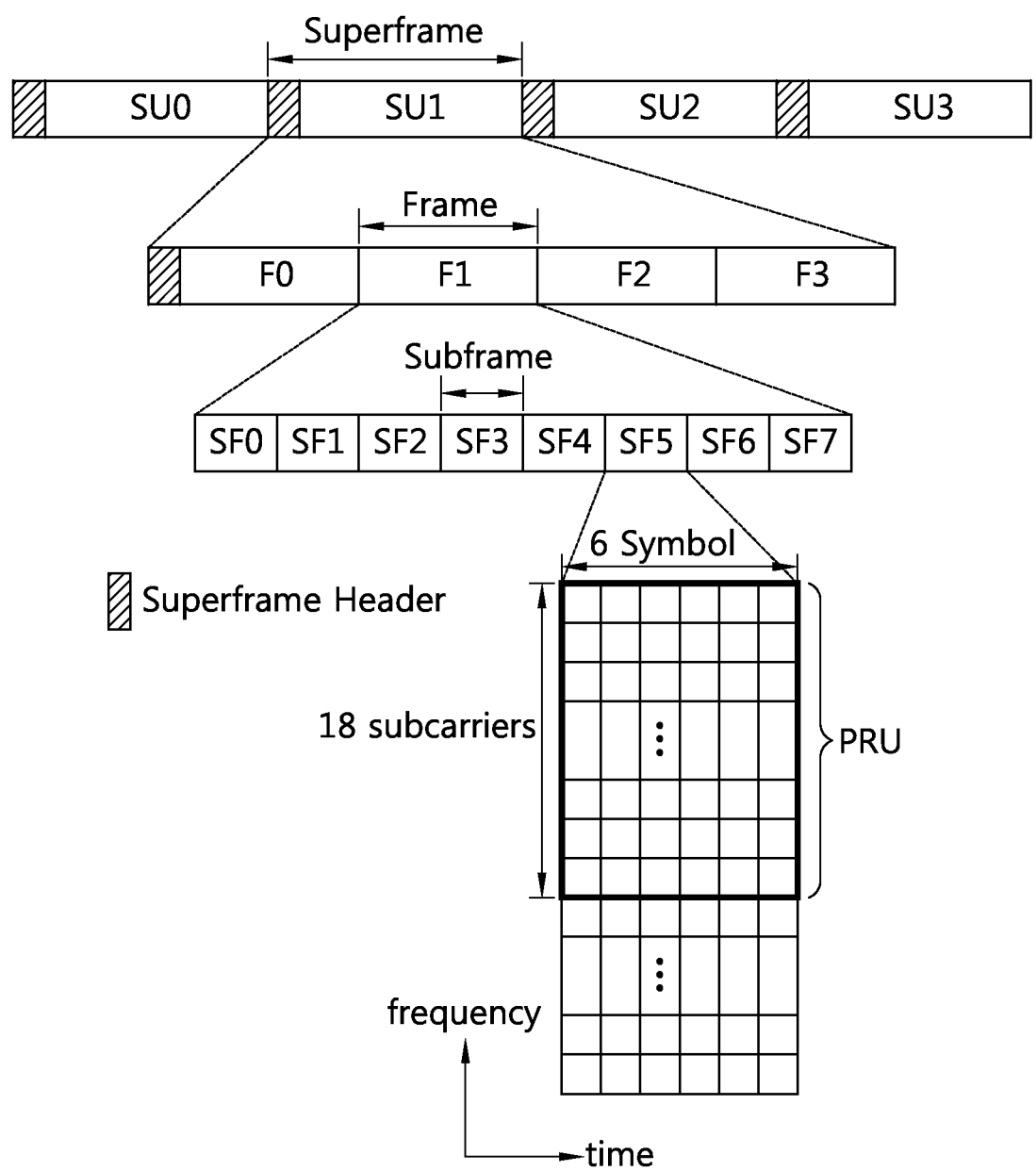
FIG. 2 shows an exemplary frame structure of an institute of electrical and electronics engineers (IEEE) 802.16m system.

FIG. 2 shows an exemplary frame structure of an IEEE 802.16m system.

A superframe (SF) includes a superframe header (SFH) and four frames F0, F1, F2, and F3. Each frame may have the same length in the SF. A size of the SF is 20 ms, and a size of each frame is 5 ms.

The frame includes a plurality of subframes SF0, SF1, SF2, SF3, SF4, SF5, SF6, and SF7. The subframe can be used for uplink transmission or downlink transmission. The subframe includes a plurality of OFDM (Orthogonal Frequency Division Multiplexing) symbols in a time domain. The OFDM symbol is for expressing one symbol period, and there is no limitation in a multiple access scheme or terminologies.

The subframe includes 6 OFDM symbols. This is for exemplary purposes only. The subframe may include 5, 7, or 9 OFDM symbols, and the present invention is not limited thereto.

A subframe type may be defined according to the number of OFDM symbols included in the subframe. For example, it may be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols.

A time division duplex (TDD) scheme or a frequency division duplex (FDD) scheme may be applied to the frame. Subframes included in a TDD frame may be divided into uplink subframes and downlink subframes.

The size of the SF, the number of frames included in the SF, the number of subframes included in the frame, and the number of OFDM symbols included in the subframe may change, and the present invention is not limited thereto.

The SFH may carry an essential system parameter and system configuration information. The SFH may be transmitted in the last 5 OFDM symbols of the first subframe included in the SF.

A physical resource unit (PRU) is a basic resource assignment unit, and includes 18 subcarriers in consecutive OFDM symbols in the same subframe.

In the IEEE 802.16 system, an advanced-MAP (A-MAP) carries service control information. A non-user specific A-MAP carries information which is not limited to a specific user or a specific user group. A hybrid automatic repeat request (HARQ) feedback A-MAP carries HARQ ACK/NACK information regarding uplink data transmission. A power control A-MAP carries a power control command for a mobile station (MS).

An assignment A-MAP carries resource assignment information. The assignment A-MAP includes several types of A-MAPs, such as a downlink (DL) basic assignment A-MAP, an uplink (UL) basic assignment A-MAP, a code division multiple access (CDMA) allocation A-MAP, etc.

The CDMA allocation A-MAP includes a UL resource assignment based on a band request or a UL resource assignment based on a ranging request.

All A-MAPs share a physical resource region called an A-MAP region. The A-MAP region exists in each DL subframe.

Figure 3:
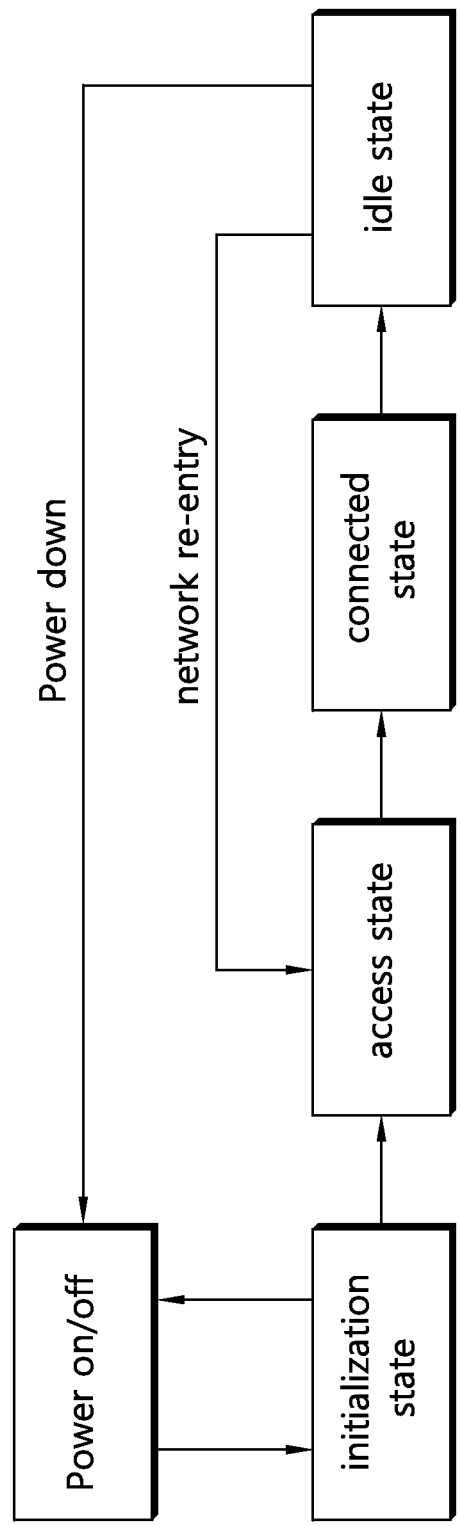
FIG. 3 shows an operation transition diagram in IEEE 802.16m.

FIG. 3 shows an operation transition diagram in IEEE 802.16m.

In an initialization state, a mobile station (MS) performs cell selection by receiving synchronization and system configuration.

In an access state, the MS performs a network entry. The network entry is a process including ranging, basic capability negotiation, and authentication with respect to a BS.

In a connected state, the MS operates in any one of a sleep mode, an active mode, and a scanning mode. During the connected state, the MS maintains a connection established during the connected state. The MS in the active mode may always transmit or receive scheduled data. In the sleep mode, a radio frame is divided into a sleep window and a listening window. The MS in the sleep mode may receive data from the BS during the listening window. The MS in the scanning mode performs measurement instructed by the BS.

In the idle state, the MS operates in the idle mode. The idle mode includes a paging available interval and a paging unavailable interval. The BS does not transmit any DL traffic (e.g., a paging message, etc.) in the paging unavailable interval.

Figure 4:
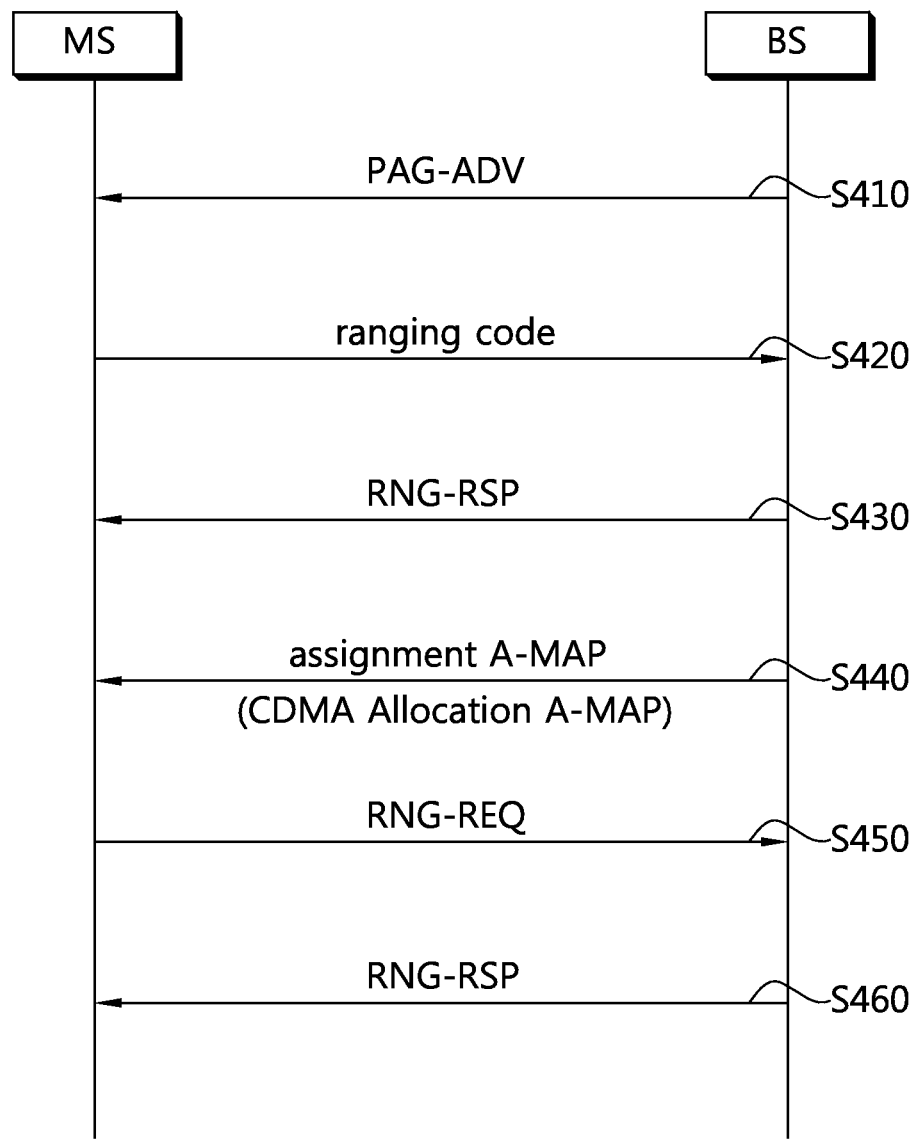
FIG. 4 is a flowchart showing an operation in an idle mode in IEEE 802.16m.

FIG. 4 is a flowchart showing an operation in an idle mode in IEEE 802.16m.

In step S410, in the idle mode, a MS monitors reception of a paging message during a paging available interval, and thus receives a paging advertisement (PAG-ADV) message. The PAG-ADV message may be one example of a paging message for attempting paging to a M2M device in the idle mode.

By using the PAG-ADV message, a BS can instruct each MS to perform ranging for a network reentry or a location update.

In step S420, when the PAG-ADV message requests the network reentry, the MS ends the idle mode, and transmits a ranging code to the BS.

In step S430, in response to the ranging code, the MS receives a ranging-response (RNG-RSP) message from the BS. The RNG-RSP message includes a status code. The status code indicates one of 'continue', 'success', and 'abort'.

If the received RNG-RSP message has the status code of 'continue', the MS retransmits the ranging code.

If the status code is 'success', in step S440, the MS receives an assignment advanced-MAP (A-MAP). The A-MAP includes a CDMA allocation A-MAP.

In step S450, by using a UL resource assignment indicated by the CDMA allocation A-MAP, the MS transmits a ranging-request (RNG-REQ) message to the BS.

In step S460, the MS receives a RNG-RSP message in response to the RNG-REQ message.

In the idle mode, the MS first transmits the ranging code for the network re-entry. The ranging code is randomly selected by the MS from a plurality of code sets, and this is called contention based ranging.

In general, a location update may be performed in an idle mode on a paging group basis. The MS may belong to one or more paging groups. A paging controller (PC) of each paging group performs paging if there is a call or data transmitted from an external network to the MS. The PC delivers a paging message to all BSs in the paging group, and each BS broadcasts the paging message for the location update to the MS.

Upon receiving the paging message for the location update, the M2M device may perform the aforementioned contention-based ranging. However, in the contention-based ranging, a time required for the ranging process may be significantly delayed, and power consumption of the M2M device may be increased.

Figure 5:
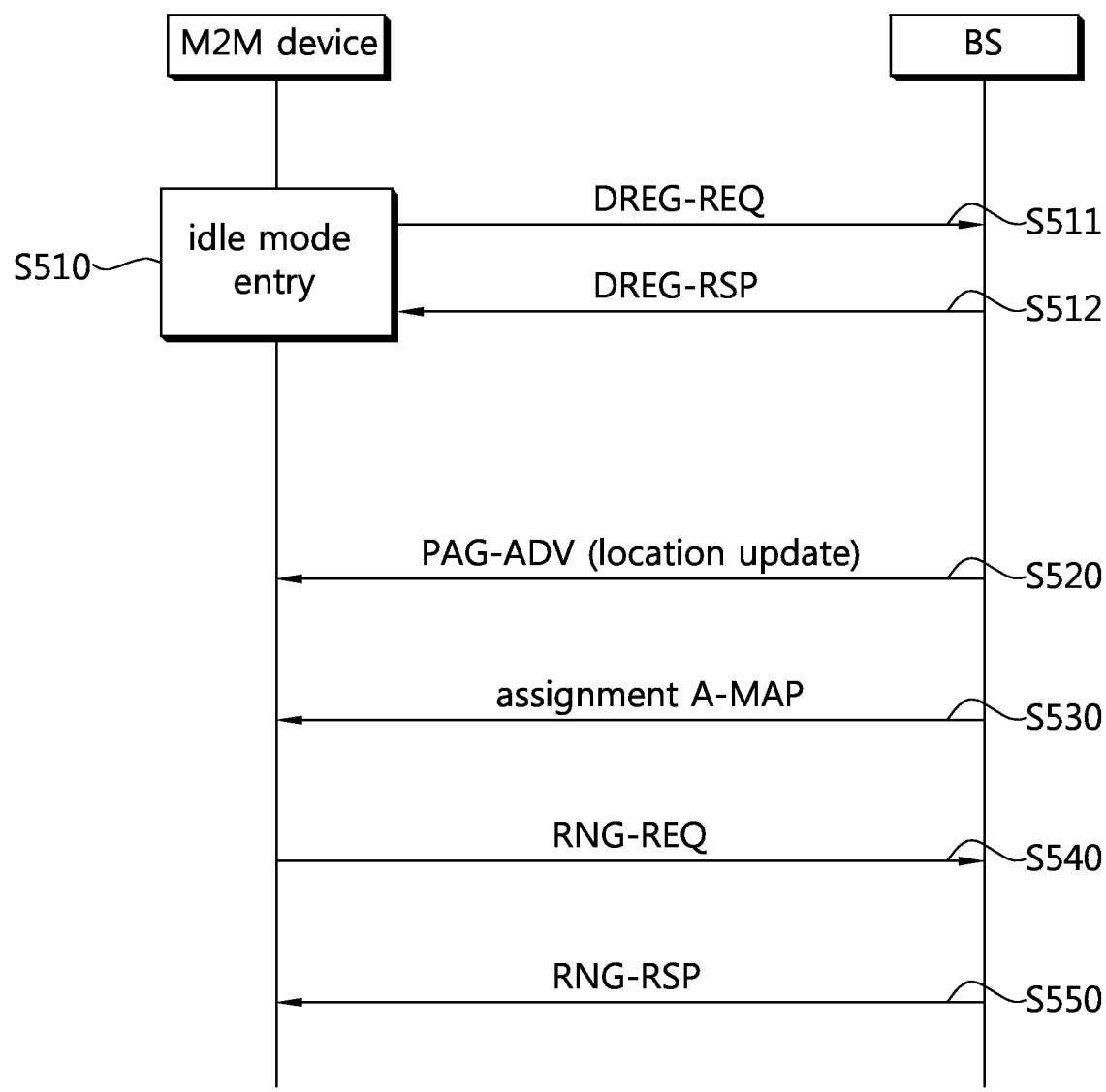
FIG. 5 is a flowchart showing a method of performing a location update according to an embodiment of the present invention.

FIG. 5 is a flowchart showing a method of performing a location update according to an embodiment of the present invention.

In step S510, a M2M device enters an idle mode. The idle mode entry may be performed at a request of the M2M device or at a command from a BS.

For the idle mode entry by the M2M device, in step S511, the M2M device sends a deregistration-request (DREG-REQ) message for requesting the idle mode entry from the BS. In step S512, the M2M device receives a deregistration-response (DREG-RSP) message for indicating to start the idle mode from the BS.

Alternatively, the BS may transmit a deregistration-command (DREG-CMD) message, and thus instruct the M2M device to enter the idle mode.

In step S520, in the idle mode, the M2M device monitors reception of a paging message during a paging available interval and thus receives a PAG-ADV message. The PAG-ADV message may instruct to perform the location update to the M2M device.

The PAG-ADV message may perform group paging or individual paging.

The following table shows an example of fields included in the PAG-ADV message for the group paging.

TABLE 1

| Field name | Size (bit) | Description |
| --- | --- | --- |
| Action code | 2 | Indicate the purpose of the PAG-ADV message. 0b01: Perform location update. |
| Network access type | 2 | Indicate a network access type. 0b00: Assign a resource for RNG-REQ 0b11: There is no dedicated resource. |
| MGID | 12 | MGID of the M2M device |
| Resource offset | | It exists when the network access type is 0b00. Indicate an offset for starting assignment A-MAP monitoring including a resource assigned for RNG-REQ. It is given on a frame basis, and a reference point of the offset is a frame in which the PAG-ADV message is transmitted. |
| Monitoring duration | | It exists when the network access type is 0b01. Time duration for monitoring a resource for RNG-REQ. |

If the PAG-ADV message indicates the location update and if the network access type is '0b00', the M2M device starts to monitor an assignment A-MAP having a resource assignment for RNG-REQ during a monitoring duration from an offset of a resource offset. If the assignment A-MAP is not successfully decoded during the monitoring duration, the M2M device may perform contention-based ranging.

The following table shows an example of fields included in the PAG-ADV message for the individual paging.

TABLE 2

| Field name | Size (bit) | Description |
| --- | --- | --- |
| Action code | 2 | Indicate the purpose of the PAG-ADV message. 0b01: Perform location update. |
| Network access type | 2 | Indicate a network access type. 0b00: Assign a resource for RNG-REQ 0b11: There is no dedicated resource. |
| FMDID | 16 | FMDID of the M2M device |
| Resource offset | | It exists when the network access type is 0b00. Indicate an offset for starting assignment A-MAP monitoring including a resource assigned for RNG-REQ. It is given on a frame basis, and a reference point of the offset is a frame in which the PAG-ADV message is transmitted. |

In step S530, the M2M device receives the assignment A-MAP on the basis of the resource offset information in the PAG-ADV message. The assignment A-MAP includes a UL resource assignment for transmission of the RNG-REQ message. The assignment A-MAP for RNG-REQ may use the existing CDMA allocation A-MAP or may use a ranging assignment A-MAP for the M2M device. An identifier dedicated for the M2M device may be masked to cyclic redundancy check (CRC) of the ranging assignment A-MAP.

In step S540, the M2M device transmits the RNG-REQ message to the BS by using the UL resource assignment in the assignment A-MAP. A ranging purpose indicator in the RNG-REQ may indicate that the M2M device starts the location update.

In step S550, the M2M device receives a RNG-RSP message in response to the RNG-REQ message.

Figure 6:
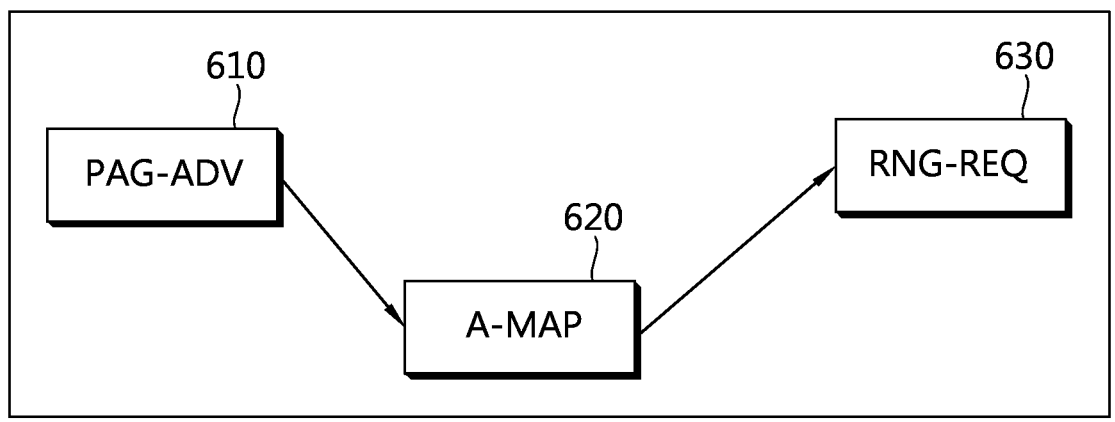
FIG. 6 shows an example of resource allocation of ranging-request (RNG-REQ) using a paging message.

FIG. 6 shows an example of resource allocation of RNG-REQ using a paging message.

A M2M device receives a resource offset of a PAG-ADV message 610, and receives an assignment A-MAP 620 on the basis of the resource offset. The M2M device transmits an RNG-REQ 630 by using UL resource assignment included in the assignment A-MAP 620.

Under the assumption that the M2M device periodically performs UL transmission to a BS, a location update without ranging is proposed. However, UL synchronization may not be maintained due to a change in a channel situation.

If the UL synchronization is no longer maintained and thus a location update is required to perform ranging, the BS does not include the resource offset to the paging message. If an access type indicates a channel assignment for RNG-REQ but there is no resource offset, the M2M device may transmit a ranging code to the BS to start a ranging process.

Figure 7:
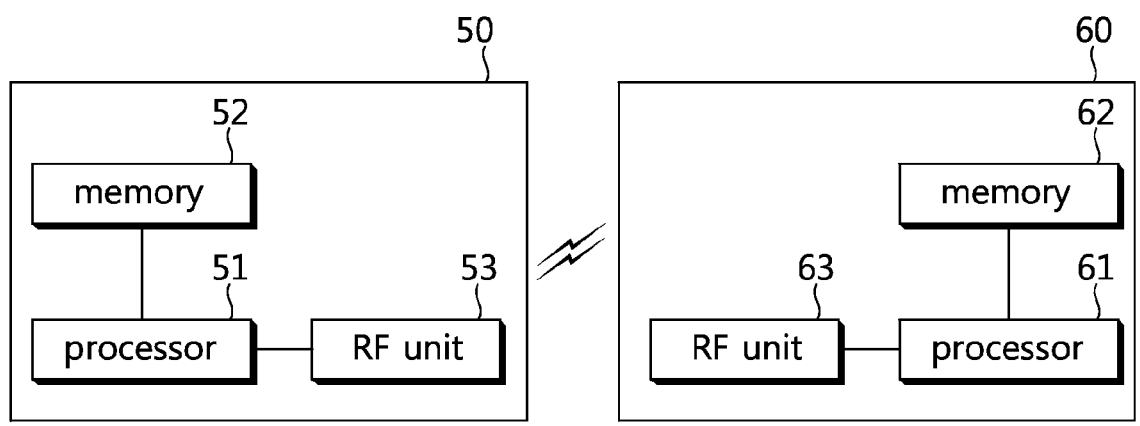
FIG. 7 is a block diagram showing a wireless communication system according to an embodiment of the present invention.

FIG. 7 is a block diagram showing a wireless communication system according to an embodiment of the present invention.

A MTC device 50 includes a processor 51, a memory 52, and a radio frequency (RF) unit 53. The memory 52 is connected to the processor 51, and stores various information used for the operations for the processor 51. The RF unit 53 is connected to the processor 51, and transmits and/or receives a radio signal. The processor 51 implements the proposed functions, processed, and/or methods. In the described embodiments, the operation of the MTC device may be implemented by the processor 51.

A BS 60 includes a processor 61, a memory 62, and an RF unit 63. The memory 62 is connected to the processor 61, and stores various information used for the operations for the processor 61. The RF unit 63 is connected to the processor 61, and transmits and/or receives a radio signal. The processor 61 implements the proposed functions, processed, and/or methods. In the described embodiments, the operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing a location update in machine-to-machine (M2M) communication, the method comprising:
    entering, by a M2M device, into an idle mode;
    receiving, by the M2M device in the idle mode, a paging message from a base station, the paging message includes an action code, a network access type and a resource offset, the action code indicating that the M2M device performs a location update, the network access type indicating a resource allocation for a ranging request, the resource offset indicating an offset for an uplink assignment; and
    transmitting, by the M2M device, the ranging request to the base station by using the uplink assignment,
    wherein the paging message further includes a fixed M2M deregistration identifier (FMDID) which is a 16-bit identifier that uniquely identifies the M2M device in the domain of the base station, and
    wherein the ranging request is transmitted when the action code indicates a location update and the network access type indicates a resource allocation for the ranging request.

2. The method of claim 1, wherein the paging message further includes a M2M group identifier that identifies a group to which the M2M device belongs.

3. The method of claim 2, wherein the resource offset indicates the offset that the M2M device starts to monitor the uplink assignment.

4. The method of claim 3, wherein the paging message further includes a monitoring duration that the M2M device monitors the uplink assignment.

5. The method of claim 4, further comprising: transmitting, by the M2M device, a ranging code to the base station if the M2M device fails to obtain the uplink assignment until an expiration of the monitoring duration.

6. The method of claim 1, wherein the ranging request includes a ranging purpose indicator indicating that the M2M device performs the location update in the idle mode.

7. A device configured for performing a location update in machine-to-machine (M2M) communication, the device comprising:
    a radio frequency unit for receiving and transmitting a radio signal; and
    a processor operatively coupled with the radio frequency unit and configured to:
        enter into an idle mode;
        receive a paging message from a base station, the paging message includes an action code, a network access type and a resource offset, the action code indicating that the device performs a location update, the network access type indicating a resource allocation for a ranging request, the resource offset indicating an offset for an uplink assignment; and
        instruct the radio frequency unit to transmit the ranging request to the base station by using the uplink assignment,
    wherein the paging message further includes a fixed M2M deregistration identifier (FMDID) which is a 16-bit identifier that uniquely identifies the M2M device in the domain of the base station, and
    wherein the ranging request is transmitted when the action code indicates a location update and the network access type indicates a resource allocation for the ranging request.

8. The device of claim 7, wherein the paging message further includes a M2M group identifier that identifies a group to which the device belongs.

9. The device of claim 8, wherein the resource offset indicates the offset that the device starts to monitor the uplink assignment.

10. The device of claim 9, wherein the paging message further includes a monitoring duration that the device monitors the uplink assignment.

11. The device of claim 10, wherein the processor is configured to instruct the radio frequency unit to transmit a ranging code to the base station if the device fails to obtain the uplink assignment until an expiration of the monitoring duration.

12. The device of claim 7, wherein the ranging request includes a ranging purpose indicator indicating that the device performs the location update in the idle mode.

* * * * *